March 19, 1935. W. E. HULL 1,994,998
COMPENSATING DEVICE FOR COMPASSES
Filed March 23, 1934

Inventor
Walter E. Hull

Patented Mar. 19, 1935

1,994,998

UNITED STATES PATENT OFFICE 1,994,998

COMPENSATING DEVICE FOR COMPASSES

Walter E. Hull, Warren, Ohio

Application March 23, 1934, Serial No. 717,011

2 Claims. (Cl. 33—225)

My invention relates to compensating devices for compasses, particularly compasses for use on automobiles, boats and aircraft, where the earth's magnetic field is distorted by magnetism from local metal and electrical equipment.

Most compensating devices now in use employ two magnetic elements which act at right angles to each other. Each of these elements is either so constructed that its effective strength may be varied or is made up of a plurality of small magnets and its strength varied by adding or removing magnets. Such devices are difficult to adjust, requiring the services of skilled workmen who understand the principles involved.

An object of my invention is to provide an effective compensating device which, by following definite rules, can be adjusted by one who is not familiar with the laws of magnetism and the principles involved in compensating compasses. Other objects are to provide a device of simple construction which will be neat in appearance and economical to manufacture.

Referring to the drawing, Figure 1 shows a side view of the compensating device mounted under a magnetic compass.

Figure 1:
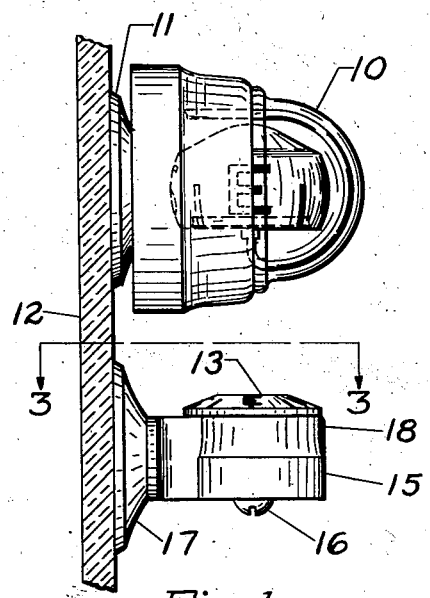
Figure 2:
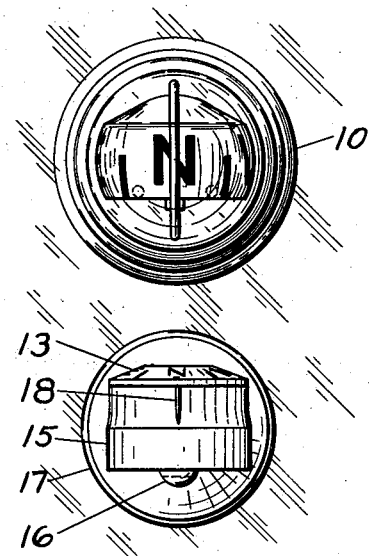
Figure 2 shows a front view of the device mounted under the compass.
Figure 3:
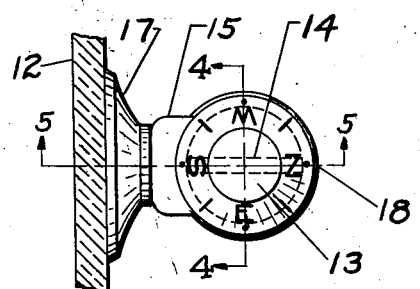
Figure 3 shows a plan view of the compensating device, taken on the line 3—3 of Figure 1.
Figure 4:
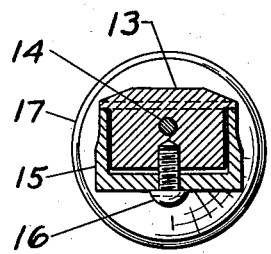
Figure 4 shows a section through the compensating device, taken on the line 4—4 of Figure 3.
Figure 5:
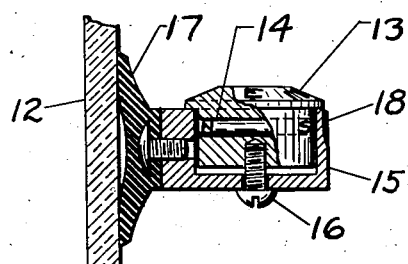
Figure 5 shows a section through the device, taken on the line 5—5 of Figure 3.

The form of my invention shown on the drawing is adapted to be used with a magnetic compass 10, which is equipped with a rubber vacuum cup 11, for securing the compass to an approximately vertical surface such as the dash or windshield of an automobile 12.

The important features of this device are the dial 13, which is graduated to correspond to the markings on a compass card, and the permanent magnet 14. The magnet 14, lies in an approximately horizontal plane and is rotatable about an approximately vertical axis. The distance between the magnet 14, and the compass 10, is varied to vary the strength of the induced magnetic field in the vicinity of the compass.

The dial 13, is of any suitable non-magnetic material such as phenolic resinous material. It has a cylindrical portion extending downwardly, through which there is a hole to take the permanent magnet 14. A suitable non-magnetic casing 15, may be provided with a cavity to take the cylindrical portion of the dial 13. The screw 16, is to lock the dial in place after it has been properly adjusted. The mark 18, shows the position of the magnet 14, relative to the casing 15. The casing 15, may be equipped with a rubber vacuum cup 17, which adapts it to be secured to the approximately vertical surface 12.

To install the compass and compensating device in an automobile, the compass is first secured in place without the compensating device. If it does not indicate the true direction the automobile is gradually turned around until the compass does indicate the true direction. There will be one direction of travel in which the compass does indicate correctly. This compass reading is noted and the dial 13, on the compensating device, is set to correspond to this compass reading. The automobile is now headed in a known direction, approximately at right angles to the direction in which the compass reads correctly without the compensating device. The compensating device is now secured in place, just close enough to bring the compass card to a correct reading. The compass will now read accurately for each direction of travel.

In explaining the principle of this device, I will first consider a compass mounted on the windshield of an automobile with no compensating device. The compass magnets will arrange themselves parallel with the magnetic field in the vicinity of the compass. I will consider this magnetic field as being made up of two component forces. One component is the earth's magnetic force and the other is the resultant of the forces due to local influences. The latter component remains at a fixed angle relative to the longitudinal axis of the automobile, regardless of the direction the automobile is headed. When the automobile is headed in such a direction that the compass gives a true reading, the two component forces are parallel with each other, therefore this compass reading determines the angle between the longitudinal axis of the automobile and the resultant of the forces due to local influences. By setting the dial 13, on the compensating device to correspond to this compass reading and placing the compensating device either above or below the compass, the permanent magnet 14, creates a magnetic force, in the vicinity of the compass, which is parallel and opposite to the resultant of the forces due to local influences. The strength of this induced magnetic force may be varied by changing the distance between the compensating device and the compass. If the compensating device is now placed at such a distance from the compass that the induced force is equal to the resultant of the forces due to local influences, the compass will indicate accurately for all directions of travel as it would if there were no local influences present.

The surface on which the compass and compensating device is mounted need not be absolutely vertical. They will operate on a surface such as a sloping windshield.

While the drawing illustrates one practical form of my invention, I do not wish to be limited to the construction shown as it is obvious that various changes could be made without departing from the essentials of the invention.

I claim:

1. A compensating device for compasses comprising a dial having compass card graduations, said dial having a cylindrical portion extending downwardly, a permanent magnet, there being a hole diametrically through said cylindrical portion to take said permanent magnet, a casing having a cavity to take said cylindrical portion, a screw extending through the bottom of said casing and engaging said portion and an elastic vacuum cup secured to said casing.

2. A compensating device for compasses comprising a dial having compass card graduations, said dial having a cylindrical portion extending downwardly, a permanent magnet, there being a diametrical hole through said cylindrical portion to take said magnet, a casing having a cavity to take said cylindrical portion, an indicating mark on said casing for co-operation with said graduations and means for supporting said casing.

WALTER E. HULL.